United States Patent

Schmidt

[11] 3,784,835
[45] Jan. 8, 1974

[54] FILM SHEET CASSETTE

[75] Inventor: Gunter Schmidt, Malibu, Calif.

[73] Assignee: Productron, Inc., Los Angeles, Calif.

[22] Filed: Feb. 14, 1972

[21] Appl. No.: 226,105

Related U.S. Application Data

[63] Continuation-in-part of Ser. No. 104,652, Jan. 7, 1971, abandoned, which is a continuation-in-part of Ser. No. 52,848, July 7, 1970.

[52] U.S. Cl. .............................. 250/480, 250/482
[51] Int. Cl. ............................................ G03b 41/16
[58] Field of Search .............................. 250/66, 68

[56] References Cited
UNITED STATES PATENTS

| 3,330,953 | 7/1967 | Erikson | 250/68 |
| 3,504,180 | 3/1970 | Tone | 250/68 |
| 3,174,039 | 3/1965 | Frede | 250/68 |

*Primary Examiner*—James W. Lawrence
*Assistant Examiner*—C. E. Church
*Attorney*—Samuel Lindenberg et al.

[57] ABSTRACT

A film sheet cassette useful in medical X-ray applications and particularly in daylight film handling systems which include a dispenser for dispensing film sheets one at a time into the cassette. In use, the loaded cassette is first exposed to an X-ray source to photograph a patient after which it may be positioned in operative relationship with respect to a film processor for releasing the exposed film sheet into the processor. The cassette is comprised of a housing including a back plate and a cover plate fixed thereto in parallel spaced relationship. A pressure plate is disposed between the back plate and cover plate and spring urged against the back plate in light tight relationship therewith. The cassette housing defines channels along opposite edges thereof for slidably receiving cam rods. The pressure plate is provided with follower studs along the edges thereof which ride on cam surfaces of the rods. Actuating pins are provided on both the dispenser and processor for protruding into the channels when the cassette is positioned in operative light tight relationship with respect thereto. The pins engage the cam rods and slide them within the channels thus causing the cam surfaces to lift the follower studs and space the pressure plate from the back plate to thus allow film sheets to enter or exit from the cassette.

12 Claims, 22 Drawing Figures

INVENTOR
GUNTER SCHMIDT
BY
Lindenberg, Freilich, & Wasserman
ATTORNEYS

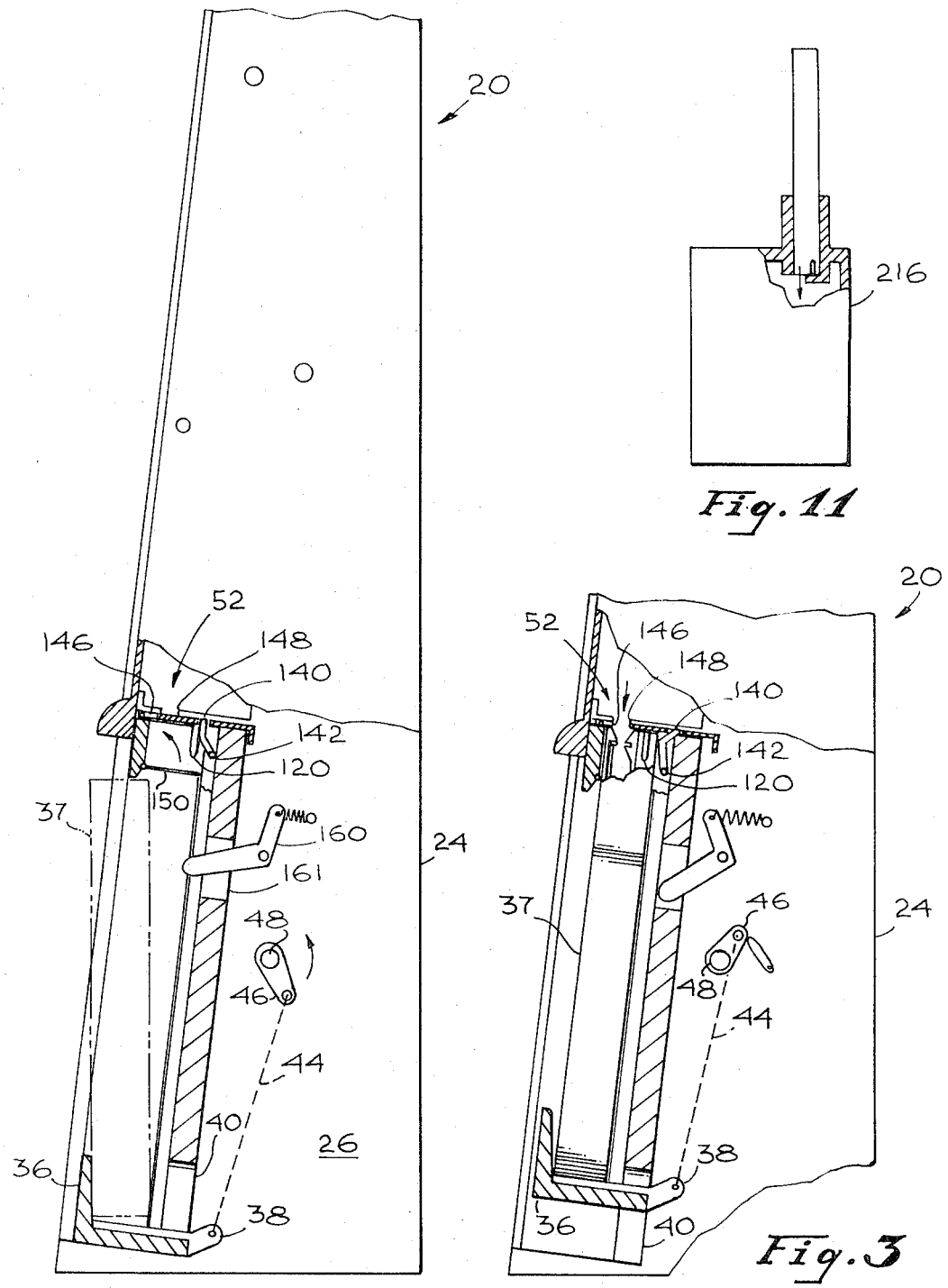

INVENTOR
GUNTER SCHMIDT

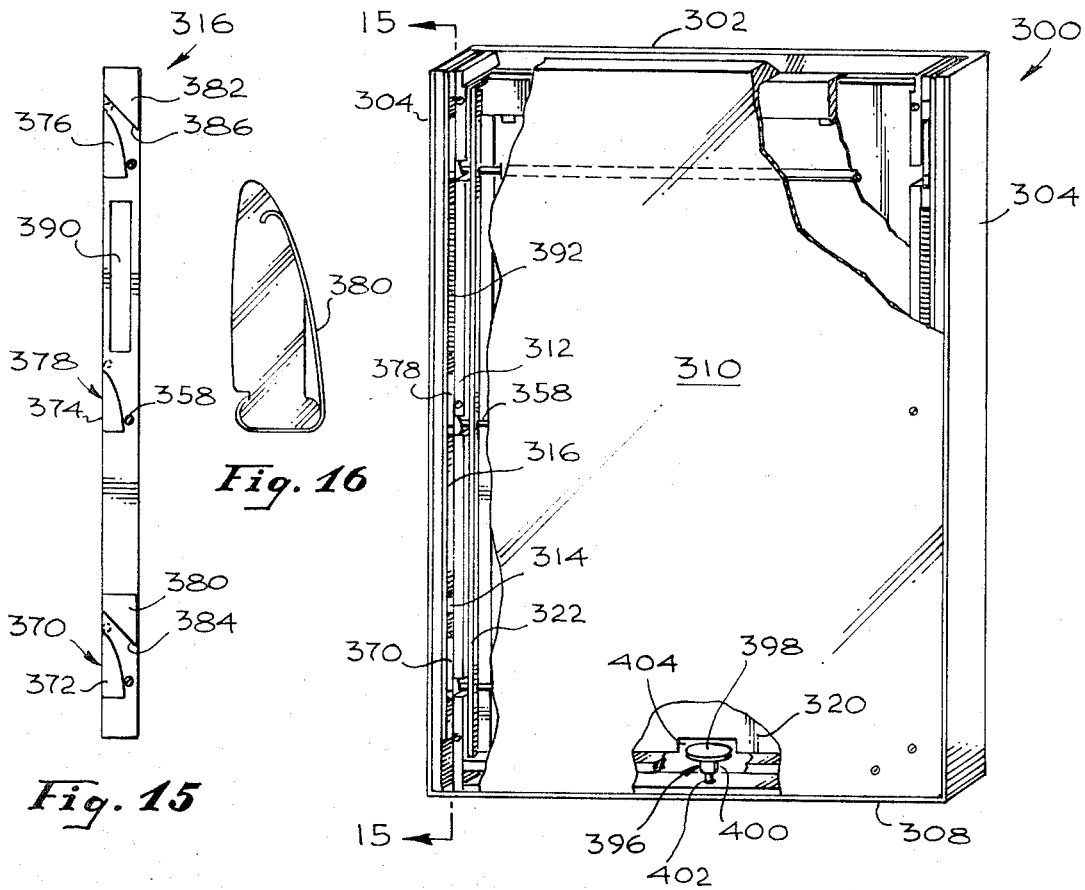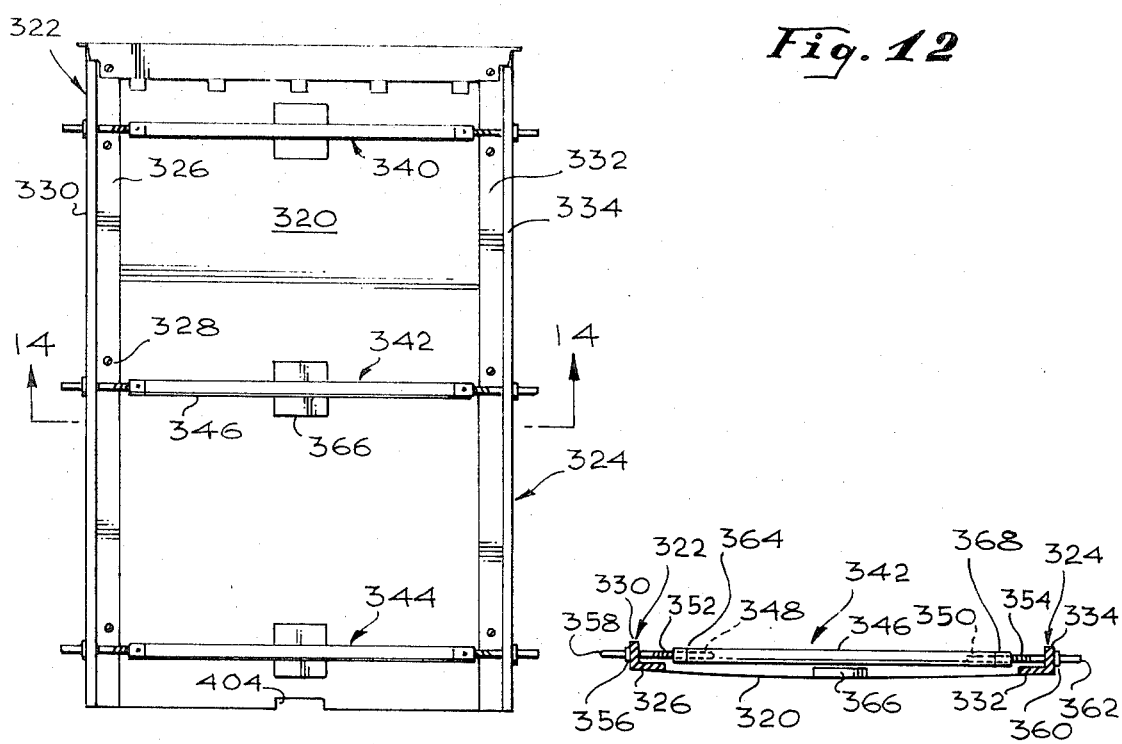

FILM SHEET CASSETTE

CROSS REFERENCE TO RELATED APPLICATION

This application is a continuation-in-part of U.S. Pat. application Ser. No. 104,652 filed Jan. 7, 1971, Gunter Schmidt entitled "Film Sheet Cassette" now abandoned which in turn was a continuation-in-part of Ser. No. 52,848, filed July 7, 1970, by Gunter Schmidt entitled "Daylight Film Handling System."

BACKGROUND OF THE INVENTION

1. Field of the Invention

This invention relates generally to a film handling system and, more particularly, to X-ray film sheet cassettes for facilitating the daylight handling of X-ray film sheets of the type primarily used in the dental, medical and industrial fields.

2. Description of the Prior Art

In the conventional use of X-ray films, as by dental and medical technicians, an X-ray film sheet is normally loaded into a cassette in a darkroom, exposed with the patient, and then again taken into the darkroom for removal from the cassette for processing. The necessity of darkroom handling of the X-ray film is inconvenient, time-consuming, and costly.

The aforecited U. S. patent application Ser. No. 52,848 discloses a film handling system which avoids the necessity of darkroom handling of X-ray film sheets. Briefly, the system disclosed in the cited application includes a film sheet dispenser for dispensing film sheets one at a time into a film sheet cassette. While in the cassette, the film sheet is exposed to photograph a patient and subsequently, the cassette is unloaded to transfer the film sheet into a processor. Transfer of the film sheet from the dispenser to the cassette to the processor is of course, performed under light tight conditions.

OBJECTS AND SUMMARY OF THE INVENTION

An object of the present invention is to provide an X-ray film sheet cassette suitable for use in a daylight film handling system.

Briefly, in accordance with the present invention, a film sheet cassette is provided including a substantially rectangular housing having a back plate and a pair of side walls projecting forwardly therefrom. A cover plate is mounted on the side walls in opposed parallel relationship to the back plate. A pressure plate is disposed intermediate the cover plate and back plate. In a first embodiment of the invention, the cover plate inner surface is provided with U-shaped springs urging the pressure plate against the back plate for clamping a film sheet flat therebetween. Engagement of the pressure plate against the back plate also engages a pair of cooperating light seal members. Channels are provided in the side walls for slidably receiving cam rods. Follower studs on the pressure plate ride on the rod cam surfaces so that as the rods slide downwardly in the channels, the follower studs are lifted to space the pressure plate from the back plate and thus permit a film sheet to enter or exit from the cassette. The rods are slid downwardly in the channels by engagement with actuating pins on a film sheet dispenser or processor which project into the channels when the cassette is operatively positioned with respect thereto.

In accordance with an alternative embodiment of the invention, the U-shaped springs are deleted and a pressure plate is utilized which is given a bow set along the length thereof. When the cam rods are in their normal upper position, the cam surfaces bear against follower studs at the top and bottom of the bowed pressure plate flexing it flat against the back plate. When the rods are slid downwardly, pressure on the top and bottom follower studs is relieved and instead a middle cam surface bears against a middle follower stud to flatten the pressure plate and space it from the back wall.

In accordance with a still further embodiment of the invention, the flat pressure plate is provided with flanges along the edges thereof which retain the ends of the bars extending across the width of the pressure plate. Means are provided between the ends of each tie bar for variably shortening the length thereof to draw the opposite flanges together and thus bow the pressure plate along the length thereof.

The novel features of the invention are set forth with particularity in the appended claims. The invention will be best understood from the following description when read in conjunction with the accompanying drawings.

BRIEF DESCRIPTION OF THE DRAWINGS

FIG. 2 is a side view, partially broken away, of the dispenser apparatus of FIG. 1 showing a cassette prior to insertion therein;

FIG. 3 is a side view, partially broken away, similar to FIG. 2 but illustrating a cassette in operative relationship with the dispenser apparatus;

FIG. 10A is a sectional view taken substantially along the plane 10A—10A of FIG. 8 illustrating the relationship between the pressure plate and back plate when the cassette is closed;

FIG. 10B is a sectional view taken substantially along the plane 10B—10B of FIG. 8 illustrating the cassette cam rod in the normal upper position when the cassette is closed;

FIG. 10C is a sectional view corresponding to FIG. 10A but illustrating the relationship between the cassette pressure plate and back plate when the cassette is open;

FIG. 10D is a sectional view corresponding to FIG. 10B but illustrating the cam rod in its lower position to thus open the cassette;

FIG. 11 is a side view partially broken away illustrating the cassette in operative relationship with a processor;

FIG. 12 is an isometric view, partially broken away, illustrating a further film cassette embodiment in accordance with the present invention;

FIG. 13 is a plan view of the pressure plate of the cassette embodiment of FIG. 12;

FIG. 14 is a sectional view taken substantially along the plane 14—14 of FIG. 13;

FIG. 15 is a sectional view taken substantially along the plane 15—15 of FIG. 12 illustrating one of the cam rods; and FIG. 16 is an enlarged plan view illustrating the construction of one of the cam rod cam elements.

DESCRIPTION OF THE PREFERRED EMBODIMENTS

Figure 1:
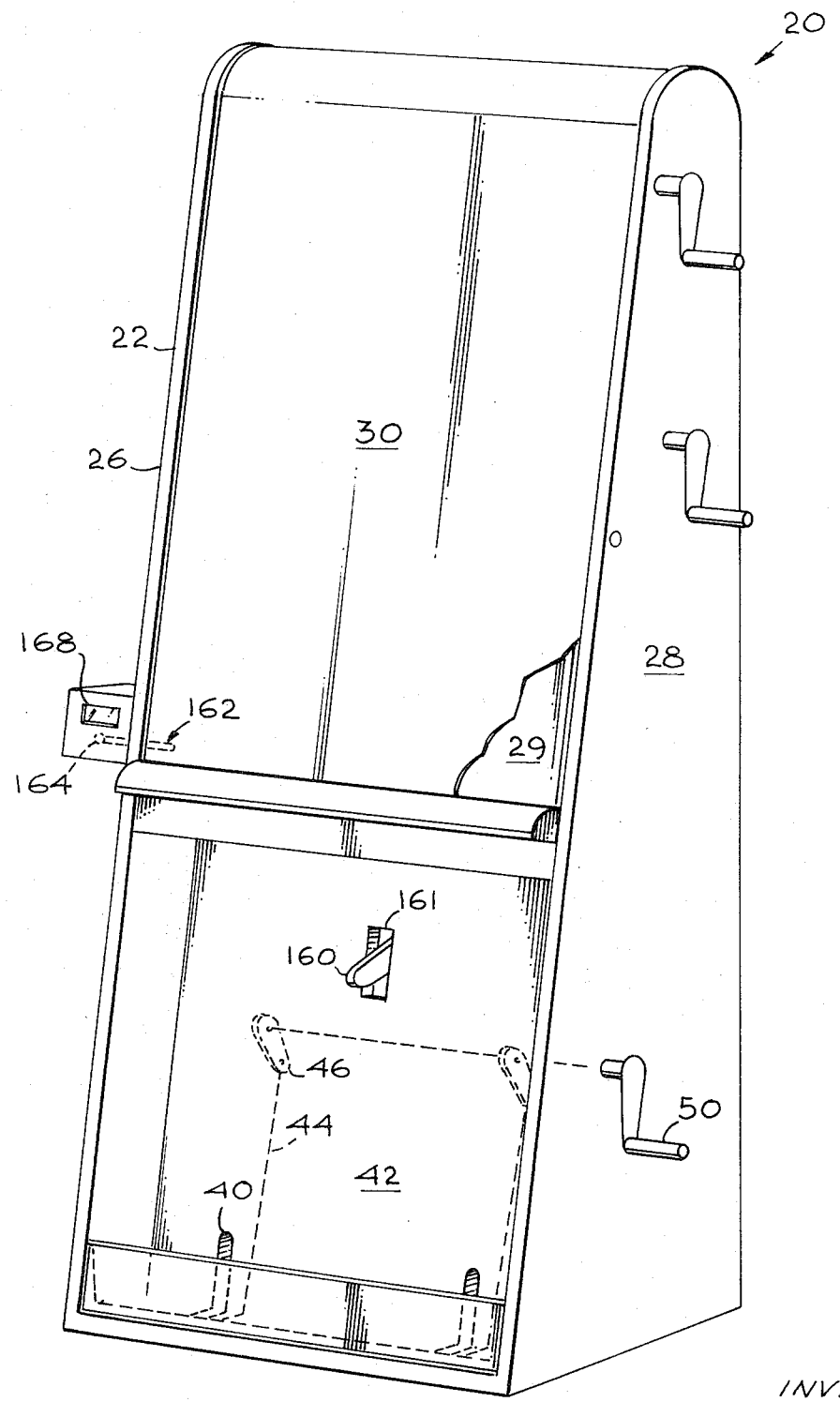
FIG. 1 is an isometric view of a film sheet dispenser apparatus useful in combination with cassette embodiments in accordance with the present invention.

Attention is now called to FIGS. 1–3 of the drawing which illustrates a dispenser 20, of the type disclosed in the aforecited patent application Ser. No. 52,848, suitable for dispensing film sheets one at a time into a cassette constructed in accordance with the teachings of the present invention. Briefly, the dispenser 20 is comprised of a housing 22 including a back wall 24 and a pair of side walls 26 and 28. The back and side walls of the dispenser housing define a compartment 29 therebetween for receiving a film sheet package from which film sheets are to be released one at a time. A slide door 30 mounted between the side walls 26 and 28 provides access to the film package compartment 29 and prevents light from seeping therein when the door is closed.

The dispenser 20 includes a tray 36 for receiving a film sheet cassette 37 (shown in dashed lines in FIG. 2). The tray 36 is carried by arms 38 mounted for movement in slots 40 formed in a wall 42. The arms 38 are coupled to rods 44 terminally secured to links 46 fixedly secured to a shaft 48. The shaft extends externally of the housing 22 and is coupled to a crank 50. Thus, by turning the crank 50, the links 46 can be rotated from the position of FIG. 2 to the position of FIG. 3 to thus raise the tray 36 to position a cassette therein adjacent to an exit opening 52 formed in the dispenser housing beneath the film package compartment 29.

Prior to further considering the additional interaction between a cassette 37 and the dispenser 20, attention is called to FIGS. 4–7 which illustrate the details of a first film sheet cassette embodiment in accordance with the present invention.

The cassette 58 of FIGS. 4–7 is comprised of a frame including a back plate 60 as well as side walls 62 and 64 and a bottom wall 66 extending forwardly therefrom. A spring equipped cover plate 68 is provided for mounting in spaced parallel relationship with respect to the back plate 60. More particularly, the walls 62 and 64 are provided with cut out portions 70 for accommodating ears 72 projecting from the edges of the cover plate 68. Aligned holes are provided in both ears 72 and cut out portions 70 for receiving screws for fastening the plate 68 to the side walls 62 and 64 in oppposition to the back plate 60. A plurality of U-shaped springs 76 are secured to the inner surface of the cover plate 68. More particularly, the bight portion 78 of the springs is secured to the cover plate with spring leg portions 79 extending toward the back plate 60 and adapted to bear against an intermediate pressure plate 80.

Figures 5A, 5B:
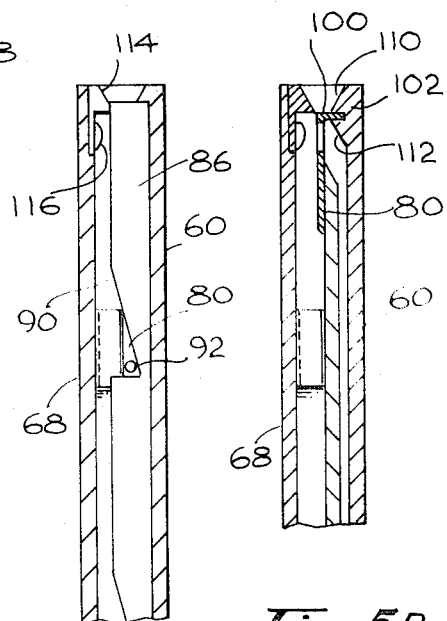
FIG. 5A is an enlarged sectional view taken substantially along the plane 5A—5A of FIG. 4 illustrating the cassette cam rod in its normal upper position when the cassette is closed.
FIG. 5B is an enlarged sectional view taken substantially along the plane 5B—5B of FIG. 4 illustrating the relationship between the pressure plate and back plate when the cassette is closed.
Figure 6:
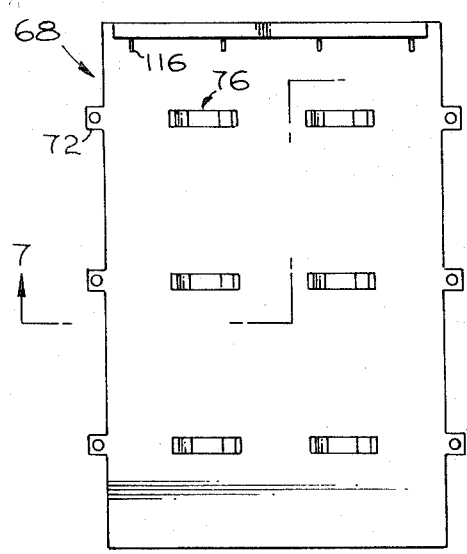
FIG. 6 is a plan view of a cover plate utilized in the cassette embodiment of FIG. 4.
Figures 5C, 5D:
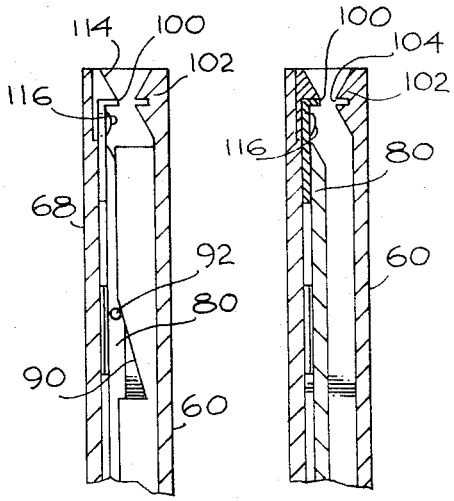
FIG. 5C is an enlarged sectional view corresponding to FIG. 5A but illustrating the cassette cam rod in its lower position to thus open the cassette.
FIG. 5D is a sectional view corresponding to FIG. 5B but illustrating the relationship between the cassette pressure plate and back plate with the cassette open.
Figure 7:
FIG. 7 is a sectional view taken substantially along the plane 7—7 of FIG. 6.

Narrow elongated passageways 82 and 84 are formed in the side walls 62 and 64, respectively. Identical cam rods 86 are respectively mounted within the passageways 82 and 84 for sliding movement therealong. As shown in FIG. 5, each cam rod is provided with a plurality of ramp cam surfaces 90 along the length thereof. The previously mentioned pressure plate 80 is provided with a plurality of cam follower studs 92 which extend outwardly from the side edge thereof and which rest on the cam surfaces 90. FIG. 5A illustrates the stud 92 at the bottom of the cam surface 90 formed in the cam rod 86. By sliding the cam rod 86 downwardly from the position shown in FIG. 5A, the follower stud 92 will ride up the ramp surface 90 to thus substantially increase the spacing between the pressure plate 80 and back plate 60. As will be seen hereinafter, when the cassette is operatively engaged with either a dispenser or processor, actuating pins thereon project through openings 99 provided at the upper ends of the side walls 62, 64 to thus engage the cam rods 86 to move them downwardly along the passageways 82, 84.

In order to prevent light from entering the cassette, a light shield is provided comprised of a flange 100 formed on the upper edge of pressure plate 80 adapted to cooperate with a slotted flexible sealing member 102 secured to the back plate 60. That is, when the cassette is closed as shown in FIGS. 5A and 5B, the flange 100 projects into the slot 104 in the sealing member 102 to prevent light from entering therebetween. When the cam rods 86 are moved downwardly to thus move the pressure plate 80 away from back plate 60, the flange 100 is, of course, withdrawn from the slot 104 (FIG. 5D) to permit a film sheet to pass therebetween. In order to facilitate the entry and exit of a film sheet into and from the cassette, the edge surfaces 110, 112 of the sealing member 102 are beveled. In addition, a beveled member 114 is provided on the inner surface of the cover plate 68 adjacent to the flange 100 to facilitate entrance of a film sheet into the cassette. Beveled members 116 are also supported on the inner surface of the cover plate 68 on the opposite side of the flange 100 which project through openings 118 in the pressure plate 80 to facilitate exit of a film sheet from the cassette. As was previously mentioned, the dispenser 20 is provided with a pair of depending actuating pins 120 (FIGS. 2 and 3) adjacent to the exit opening 52 for extending through the cassette access openings 99 into the passageways to slide the cam rods downwardly and thus space the pressure plate 80 from the back plate 60.

In using the cassette of FIGS. 4–7 with the dispenser 30 to load a film sheet into the cassette, the cassette is placed in the tray 36. The crank 50 is then turned to rotate the links 46 to thus raise the tray and position the cassette therein adjacent to the dispenser exit opening 52. In raising the cassette to the exit opening 52, the actuating pins 120 will engage the cam rods 86 to urge them downwardly to thus space the pressure plate 80 from the back plate 60.

In order to assure that no light enters the dispenser housing, a light shield is provided therein consisting of a finger 140 pivoted on one end about pin 142 and engaged on the other end with a slidably mounted plate 144. As the cassette is raised toward the exit opening 52 by action of the crank 50, it will engage the beveled surface of finger 140 to pivot clockwise to thus slide the plate 144 to the right, as seen, in FIGS. 2 and 3. Slide plate 144 has a slot 146 therein adapted to align with slot 148 in a fixed plate to permit a dispensed film sheet to pass therethrough. Additionally, a hinged plate 150 is preferably mounted beneath the slotted plate 144. Thus, as the cassette is raised into position for receiving a dispensed film sheet, both the cassette and the dispenser light shields are automatically opened. Preferably, the raising of the cassette also closes a switch (not shown) to actuate a motor to cause a film sheet to be released from the film compartment to the exit opening 52, in the manner described in the aforecited patent application Ser. No. 52,848.

A spring urged bell crank 160 is preferably provided on the dispenser to indicate the dispensing of a film sheet into the cassette. In its simplest form, the indicator constitutes a lever 162 pivoted somewhere intermediate its ends. The inner end of the lever 162 is positioned so as to be engaged by the falling film sheet to thus pivot the outer end of the lever upwardly to expose a flag 164 carried thereby in an indicator window 168. The cassette is preferably also provided with an indicator (FIG. 4) for indicating when a film sheet is present in the cassette even after the cassette has been removed from the dispenser. The cassette indicator includes a window 172 through which a flag 174, carried by a lever 175, can be seen. If the cassette contains a film sheet, the sheet will bear against the lever showing the flag 174 through the window 172. With the cassette removed from the dispenser, the U shaped springs bearing against the pressure plate 80 will clamp the film sheet, thus causing the indication to be held as long as the film sheet remains in the cassette.

Figures 8, 9, 10:
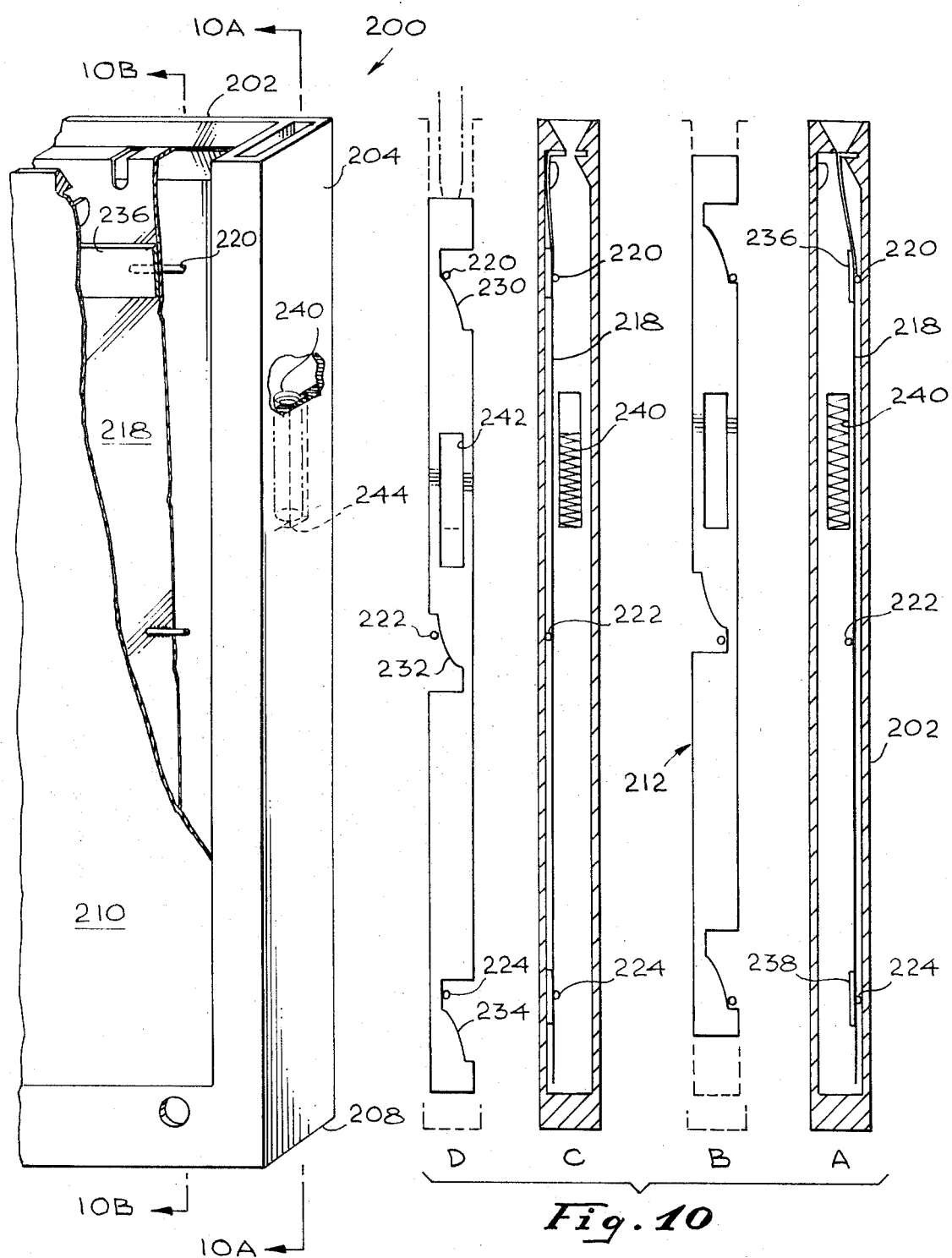
FIG. 8 is an isometric view partially broken away illustrating a second film cassette embodiment in accordance with the present invention.
FIG. 9 is a plan view of the pressure plate of FIG. 8 illustrating the curvature therein.

Attention is now called to FIGS. 8-10 which illustrate an alternative embodiment of a film sheet cassette in accordance with the present invention.

Figure 4:
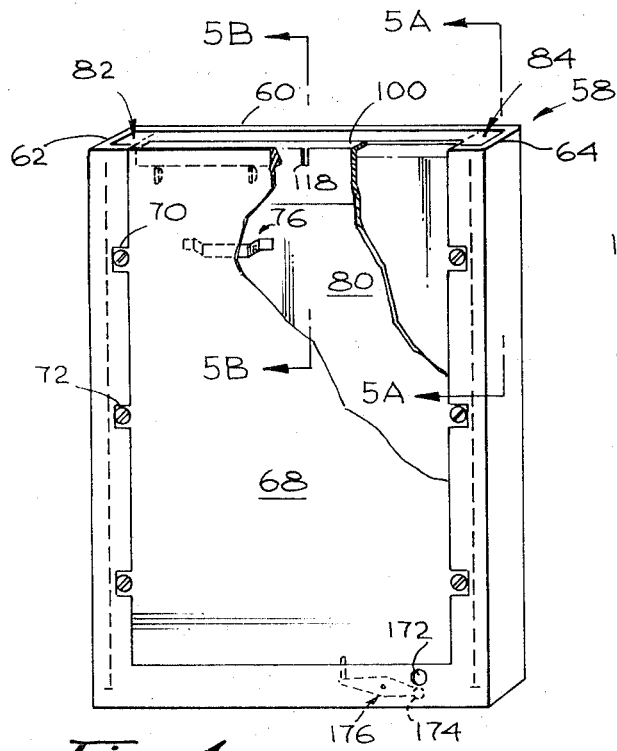
FIG. 4 is an isometric view partially broken away illustrating a first film sheet cassette embodiment in accordance with the present invention.

The film sheet cassette 200 depicted in FIGS. 8-10 is similar in construction to the film sheet cassette of FIG. 4 except, however, whereas the pressure plate 80 of the cassette of FIG. 4 is flat and rigid, the cassette 200 of FIG. 8 employs a flexible pressure plate which is resiliently bowed, preferably along the length thereof.

More particularly, the cassette 200 is comprised of a frame including a back plate 202 having side walls 204 and a bottom wall 208 extending forwardly therefrom. A cover plate 210 is adapted to be secured to the side walls and bottom walls in spaced parallel relationship with respect to the back plate 202. The side walls 204 have elongated passageways extending therethrough for respectively receiving cam rods 212 for slidable movement therein.

A pressure plate 218 is disposed between the back plate 202 and cover plate 210. The pressure plate 218 is formed of sheet stock which is rolled so as to have a bow set across its width as depicted in FIG. 9. The pressure plate 218 is oriented in the cassette so that its curvature is concave toward the cover plate. The pressure plate is provided with three pairs of follower studs 220, 222 and 224 extending out from the long edges thereof. As will be seen hereafter, when the cam rods 212 are in the normal upper position, the cam surfaces thereon bear against the upper and lower pressure plate follower studs 220 and 224 to force them to the right as depicted in FIG. 10B to thus clamp the pressure plate flat against the back plate. On the other hand, when the cam rods are depressed downwardly by actuating pins extending into the cam rod passageways, the middle cam rod surface will force the middle pressure plate follower stud 222 to the left as depicted in FIG. 10D to flatten the pressure plate in spaced relationship with respect to the back plate.

The upper middle and lower follower studs 220, 222, 224 project outwardly from each long edge of the pressure plate and respectively ride on cam surfaces 230, 232 and 234 of the cam rods. It will be noted that the middle cam surface 232 opens to the left, as seen in FIGS. 10B and 10D, while the upper and lower cam surfaces 230 and 234 open to the right. As a consequence, when the cam rod is in its normal upper position (FIG. 10B), the pressure plate 218 is held flat against the back plate 202 due to the cam surfaces 230 and 234 being positioned so as to bear against the upper and lower forward studs 220, 224 to flatten the pressure plate against the back plate. When, however, the cam rods 212 are moved downwardly to the position illustrated in FIG. 10D, the force of the cam surfaces 230 and 234 on the upper and lower follower studs is relieved while the cam surface 232 forces the middle follower stud 222 away from the back plate 202, i.e., to the left as depicted in FIG. 10D. As a consequence of this action, the pressure plate 218 is flattened in spaced relationship with respect to the back plate 202 thereby opening the cassette light shield (previously discussed in detail with respect to the embodiment of FIG. 4) to permit a film sheet to enter or exit from the cassette.

In order to assure that the pressure applied to the film sheet by the pressure plate 218 is distributed substantially uniformly over the entire film sheet area, upper and lower straps 236 and 238 extend across the width of the pressure plate and are secured at their ends thereto. As can be seen in FIG. 9, when the pressure plate is in its relieved condition, the straps 236 and 238 are straight. When the cam rods are in their normal upper position and the pressure plate is pressed flat against the back plate, the straps act to uniformly distribute the pressure across the width of the plate.

Whereas the U-shaped springs 76 in the cassette of FIG. 4 function to close the cassette light shield and force the pressure plate against the back plate, in the cassette 200 of FIGS. 8-10, a spring 240 is mounted within a slot 242 in each of the cam rods. The spring 240 is held captive between end shoulders 244 of a recess formed in the side wall passageways. Thus, spring 240 will normally urge the cam rods to the upper position illustrated in FIG. 10B. When the cam rods are engaged by actuating pins on the dispenser or processor which project downwardly into the passageways, the cam rods will slide downwardly to compress the springs 240 against the passageway recess lower shoulders as shown in FIG. 10C. Consequently, when the actuating pins are disengaged from the cassette the spring 240 will urge the cam rods to the upper position of FIG. 10B to thus clamp the pressure plate 220 against the back plate 202.

Attention is now called to FIG. 15 which illustrates an alternative embodiment of film sheet cassette in accordance with the present invention. Whereas the embodiment of FIG. 8 utilizes a pressure plate set to a bowed configuration, the embodiment of FIG. 15 employs a flat pressure plate which is bowed along its length by variable length tie bars extending across the pressure plate width.

More particularly, the cassette 300 of FIG. 15 is comprised of a frame including a back plate 302 having side walls 304 and a bottom wall 308 extending forwardly therefrom. A cover plate 310 is adapted to be secured to the side walls and bottom walls in spaced parallel relationship with respect to the back plate 302. Spaced inwardly from each side wall 304 is a parallel partition plate 312. The side walls 304 and adjacent partition plates 312 define elongated passageways 314 extending therebetween for respectively receiving cam rods 316 for slidable movement therein.

The pressure plate 320, disposed between the back plate 302 and cover plate 310, is formed of flat sheet stock and has a pair of angle irons 322 and 324 fixed thereto along opposite edges thereof. The angle iron 322 includes a horizontal member 326 secured to the flat pressure plate 320 as by machine screws 328. Vertical flange member 330 extends upwardly from the horizontal member 326 as shown in FIGS. 13 and 14. Similarly, angle iron 324 includes a horizontal member 332 secured to the pressure plate. Vertical flange member 334 extends perpendicular to the horizontal member 332.

Three variable length tie bars 340, 342, and 344 are retained between the opposed flange members 330 and 334. Since all of the tie bars are identical, only tie bar 342 will be discussed in detail. Tie bar 342 is comprised of a hollow tube 346 internally threaded in opposite directions at its ends 348 and 350. The ends 348 and 350 respectively receive externally threaded pins 352 and 354. Externally threaded pin 352 is provided with a flange 356 and a non-threaded smooth stud 358 on the other side of flange 356. Similarly, externally threaded pin 354 is provided with a flange 360 and a stud 362.

The threaded pins 352 and 354 extend through aligned apertures formed in the opposed flange members 330 and 334 of the angle irons 322 and 324. The pin flanges 356 and 360 bear inwardly against the angle iron flange members. Lock nuts 364 and 366 are threaded on the pins 352 and 354 inwardly of the angle irons 322 and 324.

As a consequence of the pins 352 and 354 being oppositely threaded, when the tube 346 is turned in the appropriate direction, the pins 352 and 345 will both be threaded into the tube 346 thus drawing the angle irons toward one another and bowing the pressure plate 320 as is best illustrated in FIG. 14. Proper illustration of the tie bars 340, 342, and 344 enables the pressure plate 320 to be bowed to the desired configuration to achieve a substantially uniform pressure over the entire film sheet when the pressure plate is pressed flat by pressure on the pin studs. After the lengths of the tie bars have been adjusted to achieve the desired bow, the lock nuts 364 and 366 are threaded down along the pins 352 and 354 to butt against the ends of the tube 346 to prevent the pins from accidentally threading out of the tube 346. Blocks 366, mounted on the surface of pressure plate 320 beneath the tie bars, serve to space the tie bars from the pressure plate.

Attention is now called to FIG. 15 which illustrates the cam rod 316 which, as has been previously mentioned, is mounted for slidable movement in the passageway 314 defined between the cassette side wall 304 and partition wall 312. The cam rod 316 is comprised of a flat rod having raised flat cam elements 370 affixed to the face thereof. More particularly, cam elements 372, 374, and 376 are affixed to a common face of the cam rod 316 spaced along the length thereof. Each of these cam elements defines a cam surface 378. Preferably, as shown in FIG. 16, the cam surfaces 378 are formed by flexible spring members 380 in order to compensate for slight misalignments between cam surfaces.

It will be recalled from FIGS. 13 and 14 that the threaded pins 352 and 354 are provided with smooth studs 358 and 362 which extend outwardly of the angle irons 322 and 324 and function as cam followers by riding along the cam surfaces defined on the cam rod 316. It will further be noted in FIG. 15 that additional cam elements 380 and 382 are provided on the face of the cam rod 316, respectively defining cam surfaces 384 and 386 opposed to the cam surfaces defined by the cam elements 372 and 376.

FIGS. 12 and 15 show that the cam rod 316 is provided with an opening 390 for receiving a spring 392 for normally urging the cam rod 316 to the upper position, as shown in FIG. 12. In this position, the stud 358 assumes the solid line position shown in FIG. 15 meaning that the cam surfaces of elements 372, 374 and 376 are forcing the pressure plate 320 flat against the back plate 302. However, when the cam rod 316 is forced downwardly from the position shown in FIG. 12, then the studs 358 will ride up the cam surfaces to the dotted line position shown in FIG. 15 thus spacing the pressure plate 320 from the back plate and enabling a film sheet to pass therebetween during either loading or unloading. It will be understood of course that the cassette 300 is provided with light shield means similar to the light shield means of the embodiments of FIGS. 4 and 8.

FIG. 12 illustrates a simple and inexpensive means for indicating whether the cassette contains a film sheet. This means consists of a simple pin 396 having a large head 398 and a reduced shank 400. The shank 400 extends through an opening 402 in the bottom wall 308 of the cassette. When no film sheet is contained within the cassette, the shank 400 is free to ride up and down in the opening 402, limited only by engagement of the head 398 against a shoulder 404 formed within the pressure plate 320. However, when the cassette contains a film sheet, the lower edge of the film sheet will rest on the head 398 and therefore prevent movement of the pin 396. Thus, a technician can easily determine whether the cassette contains a film sheet merely by determining whether or not the pin 396 is free to move in the opening 402. In addition to indicating the presence or absence of a film sheet within the cassette, the pin 396 can be used to facilitate ejection of a film sheet from the cassette, into a processor, for example.

It will be recognized that in accordance with the foregoing, a technician is able to load a film sheet into the cassette in day light without inadvertently exposing the film sheet to light. With the film sheet in the cassette, cassette light shield means prevents light from seeping therein to expose the film. The film sheet can then be exposed to an X-ray source to photograph a patient and therefter, as shown in FIG. 11, the cassette can be used to release the exposed film sheet therein into a processor 216 in daylight without exposing it to light. That is, the processor preferably includes actuating pins for projecting to the cassette side walls passageways to engage the cam rods so as to space the pressure and back plates therein from one another to thereby enable a film sheet within the cassette to fall into the processor.

Although particular embodiments of the invention have been described and illustrated herein, it is recognized that modifications and variations may readily occur to those skilled in the art and, consequently, it is intended that the claims be interpreted to cover such modifications and equivalents.

I claim:

1. A film sheet cassette comprising:
   a substantially rectangular frame including a back plate and a cover plate and side walls interconnecting said back and cover plates in spaced parallel relationship;
   means carried by said frame including a pressure plate disposed between said back and cover plates for resiliently bearing against said back plate, said pressure plate including at least first and second cam follower means secured thereto;
   first and second elongated channels defined in said frame;
   first and second cam rods respectively disposed in said first and second channels, for linear movement therein between first and second positions;
   said first and second cam rods each having cam surface means respectively engaged with said first and second cam follower means, said cam surface means being shaped to move said cam follower means away from said back plate as said cam rods are linearly moved in said channels from said first toward said second positions;
   first and second openings in said frame respectively communicating with said first and second channels for receiving pins therethrough for engaging and linearly moving said first and second cam rods;
   a film sheet entrance opening defined by said frame substantially aligned with the boundary between said back plate and pressure plate; and
   light shield means disposed adjacent to one edge of said back plate in alignment with said film sheet entrance opening for preventing the passage of light into and between said back plate and pressure plate when said cam rods are in said first position.

2. The film sheet cassette of claim 1 wherein said light shield means includes a flexible sealing member secured to said back plate adjacent said one edge thereof; and
   flange means extending substantially perpendicularly from said pressure plate for projecting into said sealing member.

3. The film sheet cassette of claim 1 wherein said pressure plate is flexible and resiliently bowed along the length thereof.

4. The film sheet cassette of claim 3 wherein said pressure plate has first and second side edges and wherein said first and second cam follower means each includes upper, middle and lower cam followers secured to said pressure plate along each of said side edges; and wherein
   said first and second cam rods each has upper and lower cam surfaces for respectively bearing against said upper and lower cam followers to urge them toward said back plate when said cam rod is in said first position and middle cam surfaces for bearing against said middle cam followers to urge them away from said back plate when said cam rod is in said second position.

5. The film sheet cassette of claim 4 including spring means normally urging said first and second cam rods to said first position and wherein said first and second openings are positioned relative to said channels so that pins engaging said cam rods through said openings will move said rods to said second position.

6. The film sheet cassette of claim 5 wherein said pressure plate is substantially flat and rigid and wherein said spring means includes at least one spring member resiliently urging said pressure plate into flat engagement with said back plate.

7. The film sheet cassette of claim 1 wherein said pressure plate is flexible; and including
   means for bowing said pressure plate along the length thereof. plate along 8. The film sheet cassette of claim 7 wherein said means for bowing said pressure plate includes at least one adjustable length tie bar means secured between the side edges of said pressure plate.

9. The film sheet cassette of claim 8 wherein said means for bowing said pressure plate includes upper middle and lower tie bar means each including an elongated central member having oppositely threaded end portions; and
   means coupling the end portions of each of said central members to opposite first and second side edges of said pressure plate for drawing said side edges toward one another as said central member is rotated.

10. The film sheet cassette of claim 9 wherein said first and second cam follower means includes studs terminally coupled to said tie bar means and extending beyond said first and second side edges of said pressure plate, respectively.

11. The film sheet cassette of claim 1 including externally visible indicator means for indicating the presence of a film sheet between said pressure plate and back plate.

12. The film sheet cassette of claim 11 wherein said indicator means includes an opening in said side wall; and
   pin means supported for movement in said side wall opening, said pin means including a portion thereof disposed adjacent to an edge of said pressure plate and back plate for engagement by a film sheet present therebetween.

* * * * *